US009578063B1

United States Patent
Iyer et al.

(10) Patent No.: US 9,578,063 B1
(45) Date of Patent: Feb. 21, 2017

(54) APPLICATION SELF-SERVICE FOR ASSURED LOG MANAGEMENT IN CLOUD ENVIRONMENTS

(71) Applicant: International Business Machines Corporation, Armonk, NY (US)

(72) Inventors: Sreekanth Ramakrishna Iyer, Bangalore (IN); Jeffrey Robert Hoy, Cary, NC (US); Kaushal Kiran Kapadia, Pune (IN); Ravi Krishnan Muthukrishnan, Durham, NC (US); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/947,524

(22) Filed: Nov. 20, 2015

(51) Int. Cl.
*H04L 29/06* (2006.01)
*G06F 9/445* (2006.01)
*G06F 17/30* (2006.01)
*G06F 11/30* (2006.01)

(52) U.S. Cl.
CPC ............ *H04L 63/20* (2013.01); *G06F 8/60* (2013.01); *G06F 17/30368* (2013.01); *H04L 63/102* (2013.01); *G06F 11/3006* (2013.01)

(58) Field of Classification Search
CPC .... H04L 63/102; H04L 63/20; G06F 11/3006; G06F 8/60; G06F 17/30368
See application file for complete search history.

(56) References Cited

U.S. PATENT DOCUMENTS

| 2014/0149576 A1* | 5/2014 | Pavlov | G06F 11/302 709/224 |
| 2014/0325620 A1 | 10/2014 | Samson et al. | |
| 2015/0074278 A1* | 3/2015 | Maes | H04L 47/70 709/226 |

FOREIGN PATENT DOCUMENTS

WO  2014077804  5/2014

OTHER PUBLICATIONS

IBM, "IBM Security QRadar Log Manager" Jan. 2013, pp. 1-4 http://www.draware.dk/fileadmin/IBM/QRadar/QRadar_Log_Manager_WGD03020USEN.pdf.*

* cited by examiner

*Primary Examiner* — Jung Kim
*Assistant Examiner* — Carlos M De Jesus Lassala
(74) *Attorney, Agent, or Firm* — Jeffrey S. LaBaw; David H. Judson

(57) ABSTRACT

A log management service provides automated log management for any applications deployed on a cloud. A security profile defining the logging requirements for the application is associated with the application. During deployment, a deployment appliance queries the service, providing an application context and deployment topology. The log management service references the supplied application context and deployment topology against the defined log requirements in the security profile and, in response, determines an applicable set of log files, residency and longevity requirements. The log management service then identifies/specifies the log collection resources and requirements that are necessary and instructs the requesting deployment process to configure the one or more log sources and event collectors as needed. As log data is generated by the log sources, logs are sent to a specified log management service provider for the deployed application, and the log management service provider handles particular audit requirements.

21 Claims, 7 Drawing Sheets

APPLICATION SELF-SERVICE FOR ASSURED LOG MANAGEMENT IN CLOUD ENVIRONMENTS

BACKGROUND OF THE INVENTION

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Businesses often have to provide information to show compliance with different government regulations. These regulations include, for example, the Sarbanes-Oxley (SOX) Act, the Health Insurance Portability and Accountability Act (HIPAA), and the like. Often times, compliance with these and other regulations may be shown using information contained in audit logs maintained by information technology (IT) organizations. For compliance reasons, these audit logs often are maintained for years. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

While compliance may be seen to ensure the ability to ensure that a security policy is enforced, compliance may also be applied to other types of policy, such as service level agreements (e.g., using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management).

Security intelligence and audit capabilities require centralized collection and management of log resources. While many options for log collection are available, centralized management becomes more difficult in a virtualized environment due to the rapidly changing software environments. More importantly, real-time application of policies on a log-by-log basis may not be possible, despite being critical for audit and security intelligence.

Prior art exists in many areas of log management. Cloud-based platforms allow for log self-registration. Also, software is available for log auto-discovery based on application installed on a machine. Centralized policy management solutions also are available. These options, however fall short in a virtualized application zone environment due to the log collection and handling requirements being both context-specific and dynamic.

BRIEF SUMMARY

According to this disclosure, a log management mechanism is provided to integrate log self-registration with centralized policies, preferably based on application context and deployment topology, to enable logs to be managed in a cloud environment.

In an embodiment, a log management service provides automated log management for any applications deployed on a cloud. A security (or "audit log") profile defining the logging requirements for the application is associated with the application. During deployment, a deployment appliance queries the service, typically providing an application context and deployment topology. The log management service references the supplied application context and deployment topology against the defined log requirements in the security profile and, in response, determines an applicable set of log files, residency and longevity requirements. The log management service then identifies/specifies the log collection resources and requirements that are necessary and instructs the requesting deployment process (or some other entity) to configure the one or more log sources and event collectors as needed. As log data is generated by the log sources, logs are sent to a specified log management service provider for the deployed application, and the log management service provider handles particular audit requirements.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
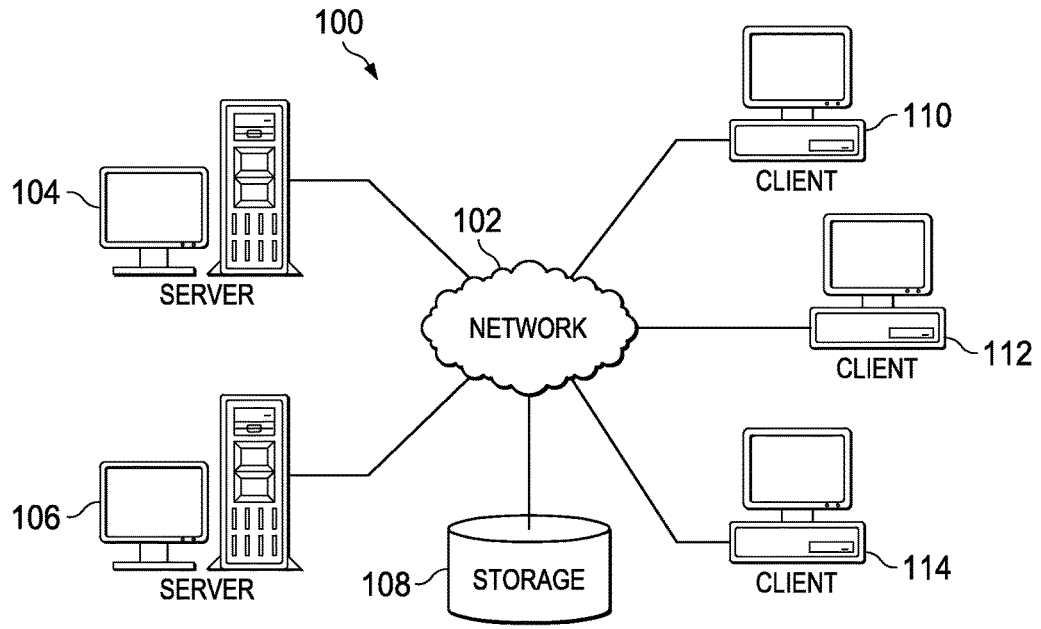
FIG. 1 depicts an exemplary block diagram of a distributed data processing environment in which exemplary aspects of the illustrative embodiments may be implemented.
Figure 2:
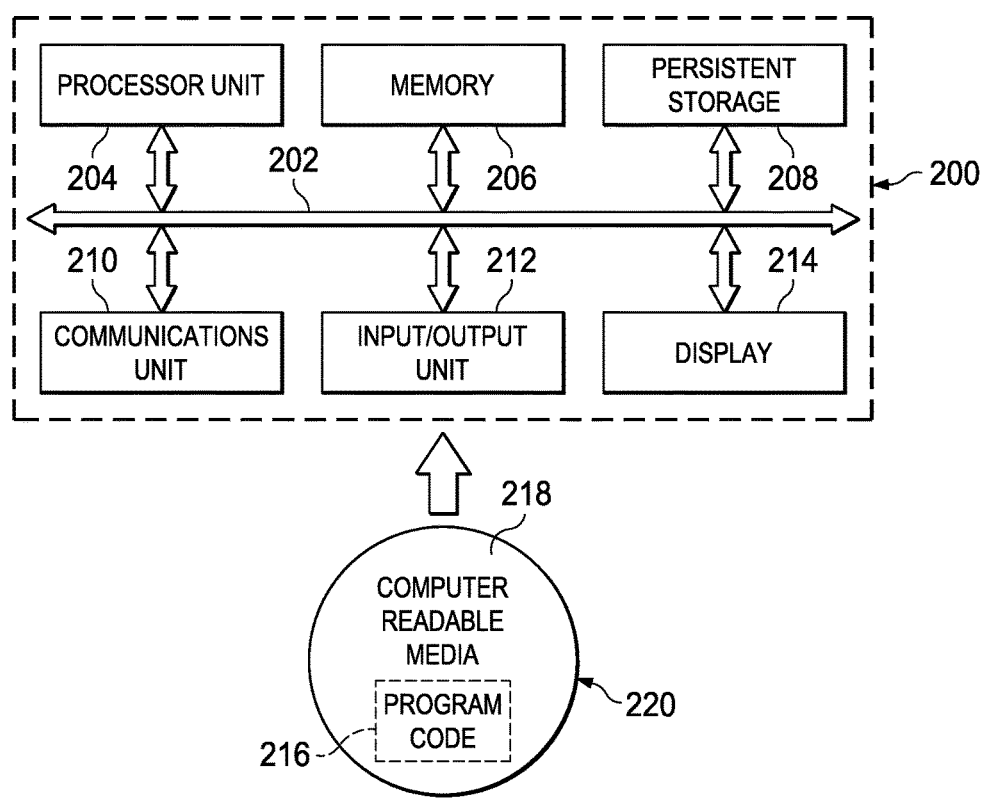
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
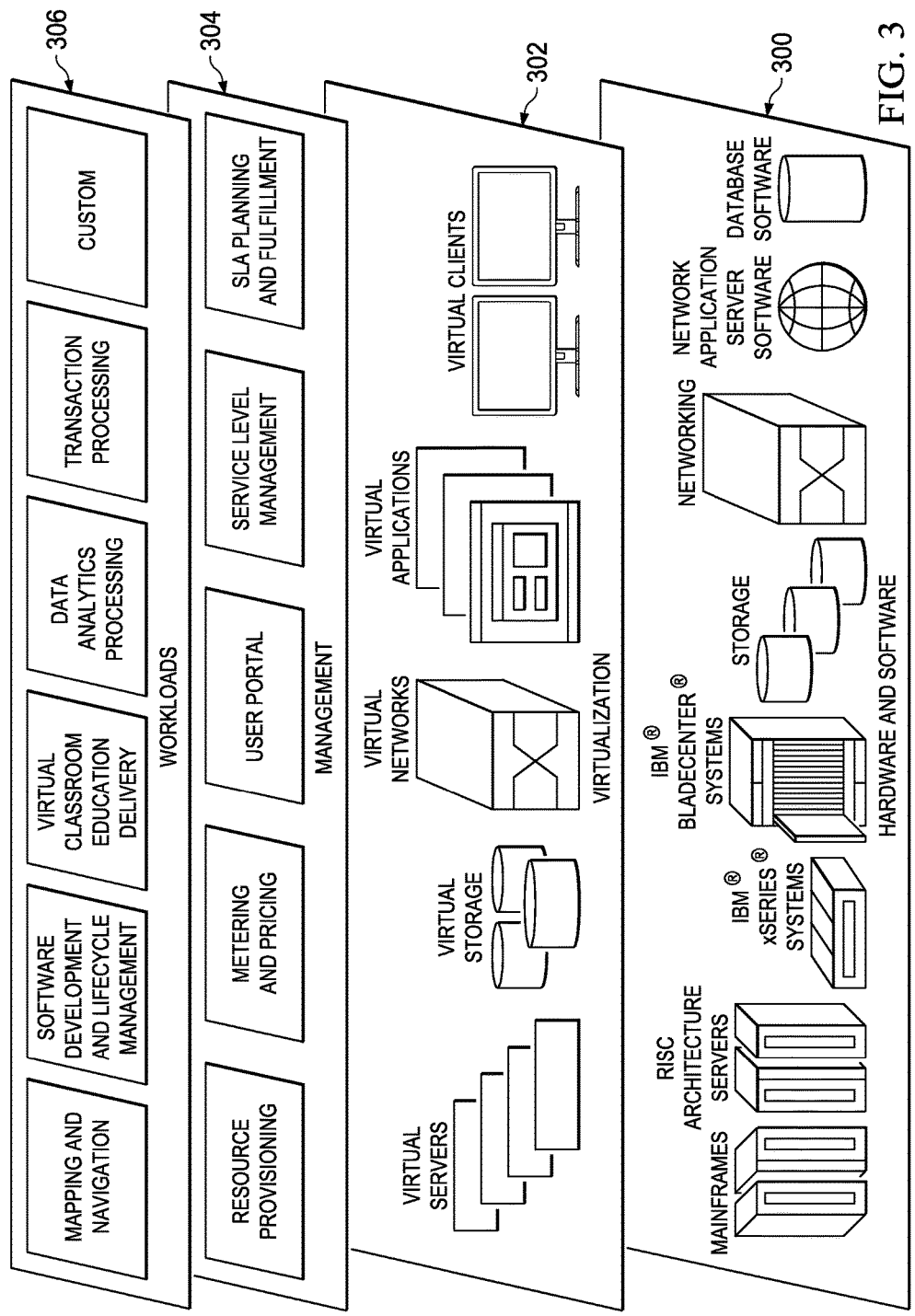
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Cloud Deployment Technologies

It is known to provide an appliance-based solution to facilitate rapid adoption and deployment of both Infrastructure and Platform as Service offerings. As described above, one such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
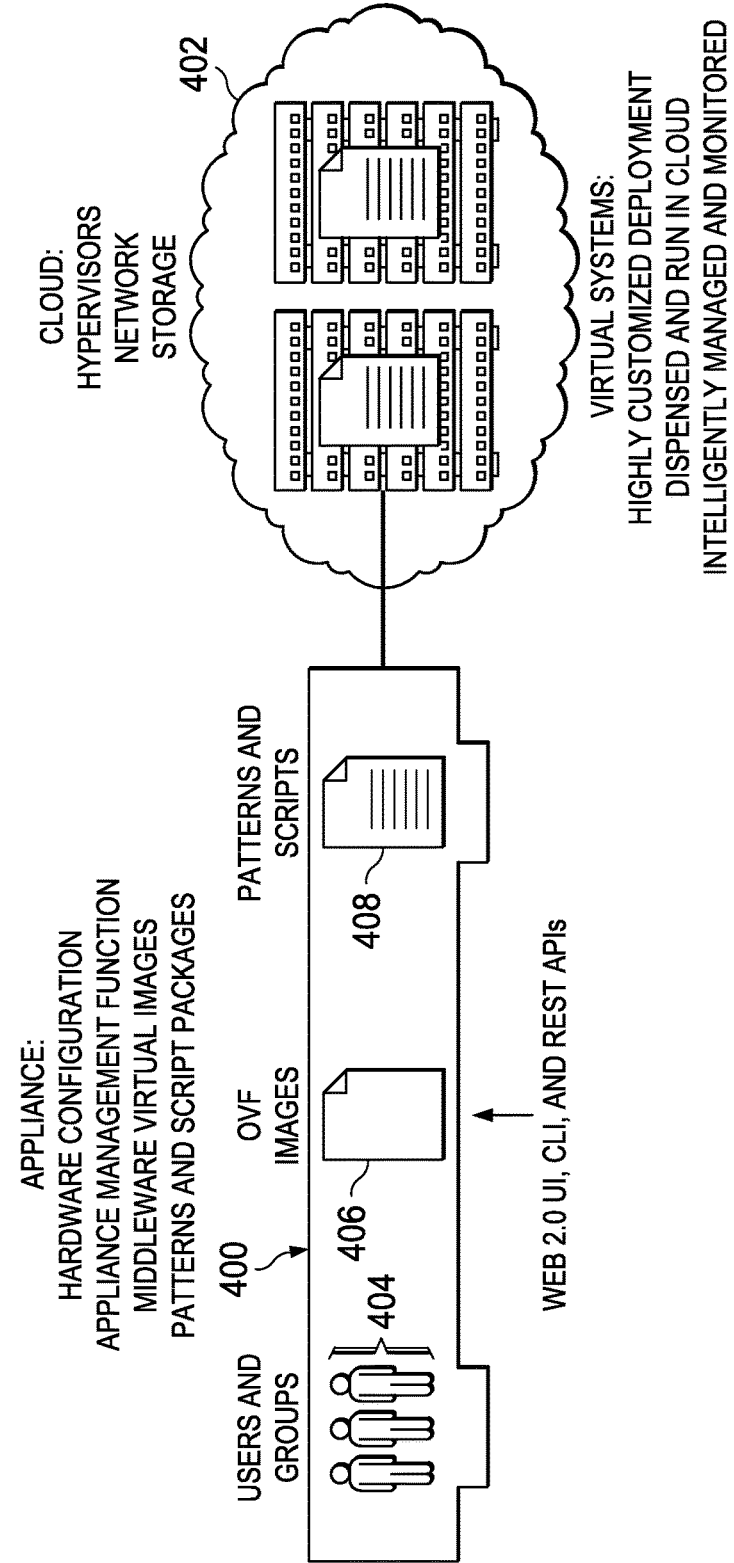
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. As will be described in more detail below, preferably patterns are structured according to the TOSCA specification. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
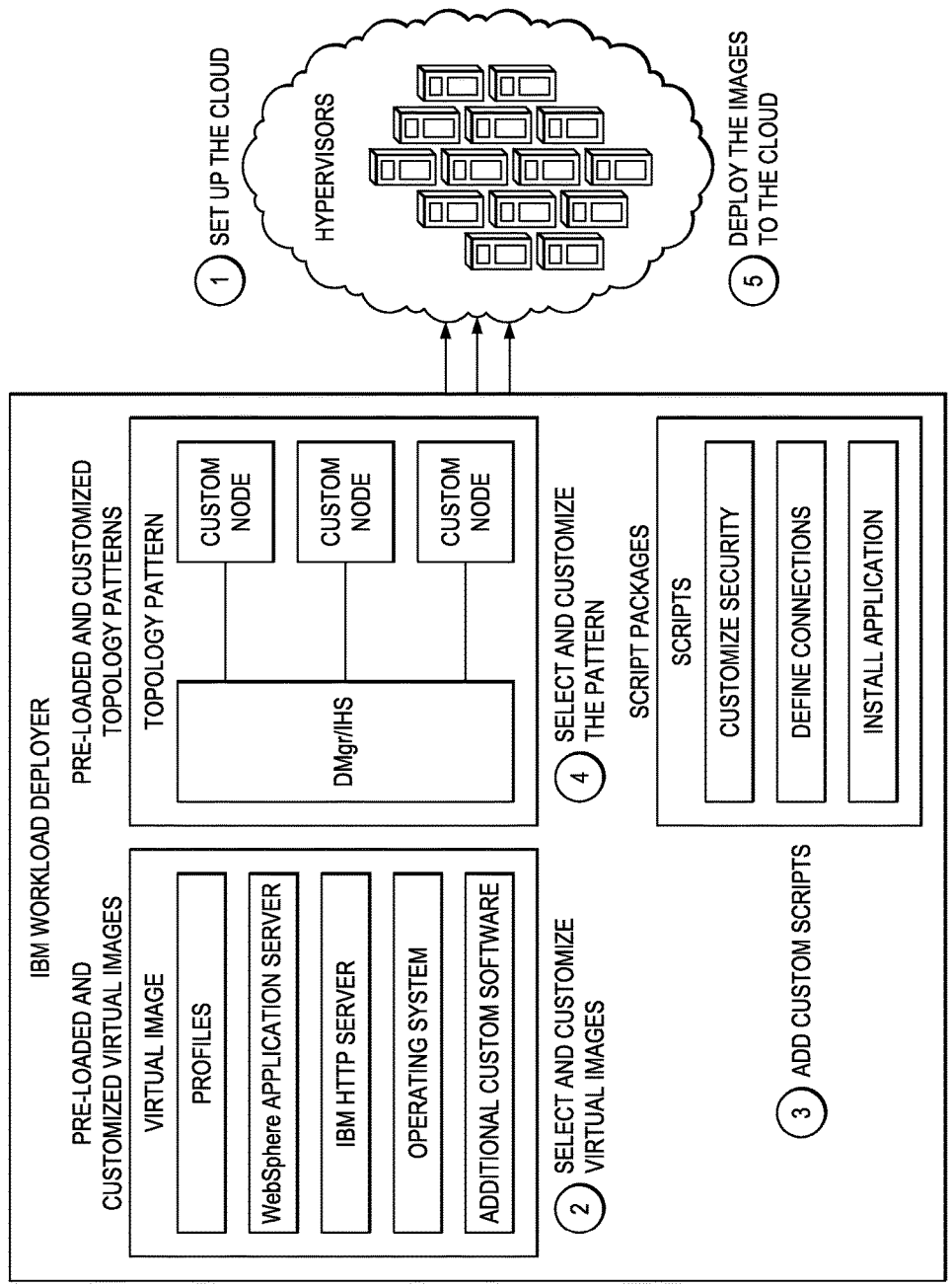
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described. Specific references to IWD should be construed to include both the above-identified product, as well as other technologies that implement the functionality referenced above.

Context-Based Security Assurance Service

As further background to the subject disclosure, the following section describes a "context-based security assurance service" or a "security assurance service" (or just the "service" as a short-hand) in which log managements techniques of this disclosure preferably are implemented.

Without limitation, the security assurance service may be implemented within or in association with a cloud deployment platform system or appliance (FIG. 4) as has been described, or using any other type of deployment systems, products, devices, programs or processes. A representative cloud application platform with which the security assurance service may be implemented includes, without limitation, IBM® PureApplication System, which is a platform system specifically design and tuned for running applications, and that supports the use of patterns for easy deployment into its cloud environment. The reference to this commercial system is not intended to be limited, as the security assurance service may interoperate with any cloud infrastructure.

The security assurance service may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

The following is a high-level description of the security assurance service. Generally, the service operates generally to gather (or otherwise obtain from other data sources) information about available cloud platforms, topologies and capabilities. The service also identifies security capabilities that are available to be setup. These security capabilities include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others. Preferably, the service simplifies (or abstracts) the available capabilities into easy-to-understand security assurance categories for the environment's existing topology. As a non-limiting and representative example, one such categorization may include "high/medium/low"-style categories, where, say, a "medium" assurance may correspond to SSL-protected traffic, IPS and SIEM integration, but no resource segregation and isolation of multi-factor authentication.

Preferably, the assurance service exposes the categories to the user (during application deployment) as "templates." A template has a given set of one or more security configuration changes associated therewith. The user (typically the application developer) then selects one or more of such security templates that he or she would like the service to configure/provision the application against. The service may provide a recommendation to the user in this regard. Based on the user selections, the service then interprets the requested one or more security assurance templates and, in response, generates a concrete list of one or more security configuration changes (typically changes/updates to security settings to existing security infrastructure). Optionally, the service also generates a note to the security administrator(s) of the capabilities being used for the application. During the application deployment, the service applies the security changes, preferably remotely, using REST-based (or equivalent) interfaces to existing (configured) security products, and, as necessary to meet the template(s), it also deploys new security software instances (as applicable and if licenses are available). The service may also provision hardware and network environments, preferably using existing cloud facilities, and as needed by the application. In this manner, the security assurance service creates a context-specific secure cloud application zone for the application-being-deployed. The application deployment platform is called-back when the security configuration update completes; the platform then completes the deployments, and activates the newly-deployed and secured application.

As described, the assurance service preferably operates in a context-based manner, taking into consideration the "context" in which the application is to be deployed. Representative "context" information includes, without limitation, the nature of the target platform, the nature of the environment in which the workload is anticipated to execute, the nature of any compliance or other regulatory requirements for the workload, and so forth. Thus, for example, if the workload is being deployed on the Amazon cloud (which is public), the service would consider public cloud requirements, such as SSL communication for all traffic, even though such requirements would not necessarily be enforced in a private cloud. As another example, if the workload is running in a test or development environment, service may only provision minimal controls around data, as the application (in this context) would not be handling real (live) customer data. As yet another example, if the workload needs to be PCI-compliant, then the service may provision it only on a certain network but not allow (or otherwise block) the move of the workload to a network or VLAN that is not secure. These are merely representative examples. The security context information is gathered by the security assurance service directly, or such information is made available to the security assurance service from other connected data sources that have that information (or access to that information).

Figure 6:
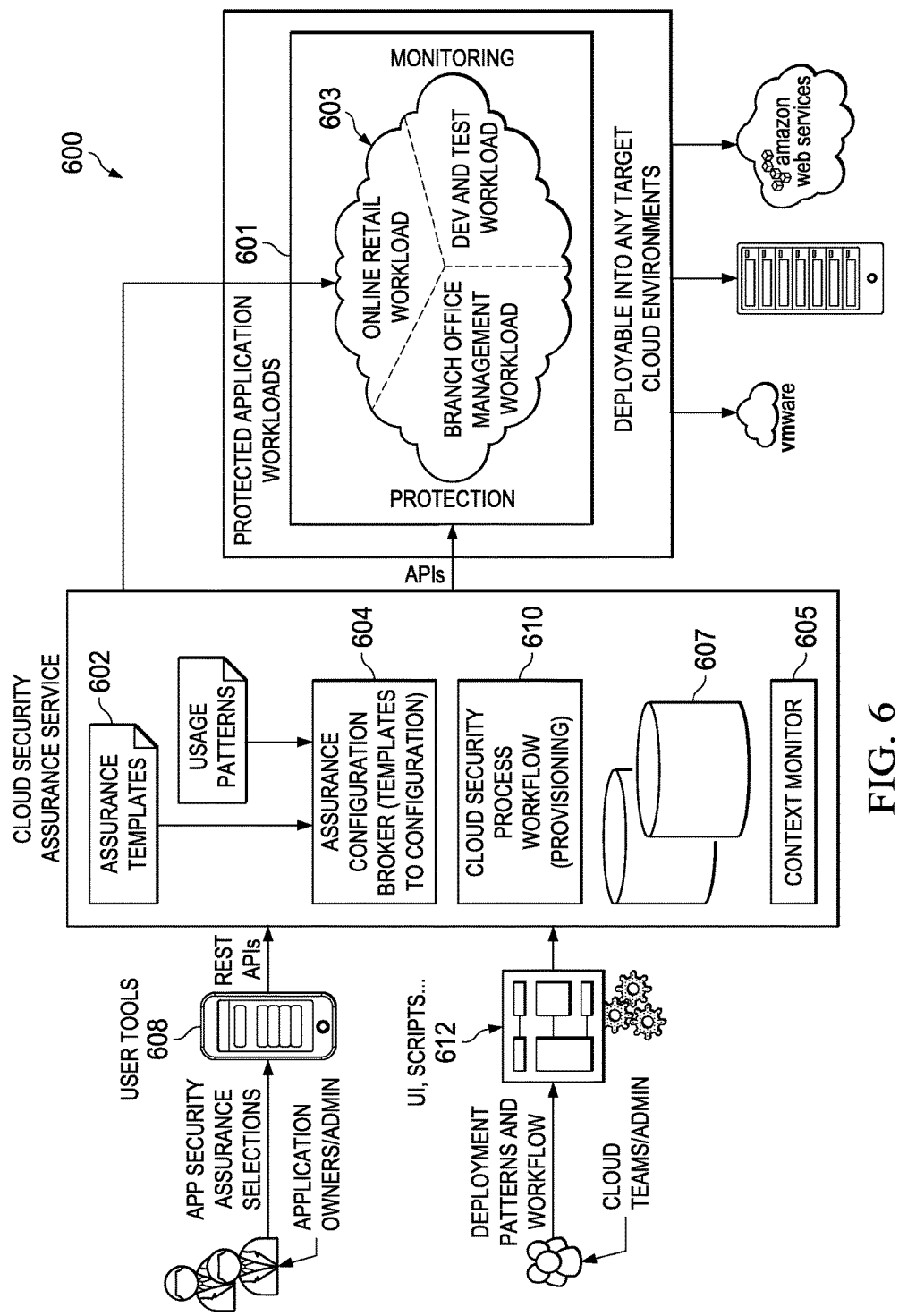
FIG. 6 illustrates a block diagram of the basic operational components of the security assurance service of this disclosure.

FIG. 6 illustrates the basic components of a representative embodiment of a cloud security assurance service 600. As described, the approach provides for a centralized or federated service that manages all (or defined ones of) security resources impacted by application deployment. These resources may be quite varied and include, among others, reverse proxies, HTTP servers, authorization updates, addition of new identities, provisioning of VPNs, log integration with a SIEM solution, DMZs, firewall configuration to open ports, and so forth. Preferably, the service invokes remote interfaces (e.g., REST-based interfaces) to update configurations for the security resources. The determination of which security resources get updated and how depends on a template-based approach. In particular, the service 600 provides for one or more security assurance templates 602 (or just "templates") that are preferably based on and derived from available resources and configuration information discovered by (or otherwise made available to) the service. In the alternative, a security template may be predefined or relatively "static" based on information derived from other security infrastructure implementations (or knowledge bases). Preferably, and as used herein, the assurance templates 602 are modules within the service that provide easy-to-understand security categories or profiles, and their associated security levels, such as "high/medium/low internal network security" and "high/medium/low firewall security," and the like. The service 600 also includes an assurance configuration broker 604, which identifies the security goals of selected templates, and that operates to translate selection of a template into detailed configuration steps, preferably based on system configuration and context of available resources. This translation operation is described in more detail below.

As depicted, the security assurance service also preferably includes (or has associated therewith) a context monitor 606, which catalogs and tracks cloud topologies and capabilities. Further, the service includes (or has associated therewith) a security management interface 608, which is a configuration point that is used to add or remove security templates, to provide manual configuration of managed security resources, and/or to override (under permitted circumstances) a security template selected by an end user. The security assurance service also includes a cloud security process workflow 610, which is a module that invokes appropriate (e.g. REST-based) interfaces to apply changes to underlying security infrastructure (security resources) as indicated by the configuration broker 604. An assurance pattern module 612 is a cloud-specific service that coordinates application deployment and provisioning with the security assurance service 600. Typically, the assurance pattern module 612 comprises a component of some other cloud application platform, although this is not a requirement. The assurance pattern module 612 queries the assurance service for available assurance templates 602 based on the application being deployed.

In FIG. 6, the application owners/administrators at the top left represent the application deployer(s); these are individuals who preferably only need to have access to the easy-to-understand security assurance level designators (by category/security level). The cloud teams or other administrators at the bottom left represent individuals who might require more specific information about the underlying security settings for security resources that provide these security assurance levels.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the security assurance service be executed by a particular component as named above, as the functionality herein (or any aspect thereof) may be implemented in other or systems.

The security assurance service may be implemented by a cloud service provider that operates infrastructure for a private cloud, a public cloud, or a hybrid cloud. In one particular implementation scenario, an enterprise has an associated private cloud (implemented within a cloud service) that is managed by a cloud application platform. That platform may then be augmented to interoperate with (or to actually include) the security assurance service of this disclosure. More generally, the security assurance service may be implemented by an enterprise in a standalone manner. It may be available as a managed service provided by a cloud service or some other service provider.

The service operates by having an end user provide a generalized specification of a security level (e.g., "high network security") that the service then uses (after interpreting application requirements and available resources) to generate a security-optimized deployment for an application. Typically, the application is being deployed into an existing environment, and the security assurance service operates to define and/or tailor the security configuration changes required for that existing environment (into which the application will be deployed). The security-optimized deployment for the application is sometimes referred to herein as a secure context-based "cloud application zone" or, as a shorthand, a "secure application zone."

The "security levels" as used herein are sometimes referred to as "security assurance levels." These levels, as noted above, are exposed as easy-to-understand or "coarse" grained descriptors ("high" or "low"), as compared to more fine-grained specificity that might otherwise be known or available to, say, a security expert. The terms "coarse" or "fine" are relative phrases, but the notion of a "coarse" designation of a security assurance level is one that merely provides the basic information available to the user who might not otherwise know or be able to ascertain (or care about) the explicit security requirements underlying a particular "coarse" security assurance level. It is sufficient for the user in this circumstance to know only that the security assurance level he or she desires (for a particular category) be "high" or "low" or some other such classification (however delineated). Thus, the term "high" (in reference to a particular coarse security assurance level) may be designated in the alternative by a numerical value, some other identifier or designation.

In a representative embodiment, the service exposes, provides or interoperates with a set of security templates, which may be categorized according to type. These templates are provided by the assurance template module shown in FIG. 6. Thus, for example, the service may expose security templates having the following categories: "Internal Network Security," "Application Security," "Data Security" and "Intruder Protection." These are merely representative. A particular template category may then be identified according to a defined security level: such as "Low" or "High." The service may provide just "Low" or "High" templates, or it may provide further levels (e.g., Low, Medium and High, or further more specific levels, etc.). A particular enterprise application being deployed thus may have one or more such security templates associated therewith, each defining a category and a specified security level. Thus, for example, a particular application being deployed may have the following specification: Internal Network Security (Low), Application Security (High), Data Security (High) and Intruder Protection (High). A web-based or other configuration interface may be used to specify the one or more security templates that are to be associated with a particular application being deployed. This interface may be associated with a conventional workload deployment tool, such as IBM® Workload Deployer Virtual Application Builder. In an alternative, the categories and security levels are defined automatically or programmatically, or such information is made available from a repository of such data published by another source.

As used herein, a "template" or "security template" refers to a profile or set of security settings that are expected to provide a specific level of security on or with respect to a given security resource, which security resource may be a system, device, appliance, program, process or other computing entity within the security infrastructure. Preferably, each security template has associated therewith one or more security configurations (security resource settings) that implement the category (and at the specified level). Preferably, these security configurations are identified by the security assurance configuration broker component (see, FIG. 6), which takes (as input) the security goals of the selected template and translates that selection into detailed configuration steps (or changes) based on the system configuration and the context of available resources (as supplied by the context monitor).

Thus, for example, if the application category is "Internal Network Security" and the security level is, say, "Low," the broker determines that the detailed security steps necessary to implement that template might include: (i) creating a "junction" between a front-end proxy server and a back-end Web application server based on application endpoint, (ii) use basic authentication for the junction and configure a trust association interceptor (TAI) in the application server for single sign-on (SSO), and (iii) enable restrictive firewalls, and open ports to the application endpoint. As another example, if the application category is "Application Security" and the security level is, say, "High," the detailed security steps necessary to implement that template might include: (i) run a security analytic tool (e.g., AppScan) against endpoints and halt deployment if any critical vulnerabilities are identified, (ii) instruct the cloud application platform to provision a VPN to host the application in the cloud, (iii) configure access manager policies for authorized roles defined by the application, and (iv) create an additional software-based DMZ in the cloud dedicated to the application. As yet another example, if the application category is "Data Security" and the security level is, say, "Low," the detailed security steps necessary to implement that template might include (i) update application server to use an SSL connection to the database, or the like. As still another example, if the application category is "Intruder Protection" and the security level is, say, "High," the detailed security steps necessary to implement that template might include: (i) configure the security intelligence platform (e.g., IBM® QRadar) log sources, (ii) update SIEM filters for the application, and (iii) update IPS rules for the application. Of course, these are merely representative (non-limiting) examples of the security configuration changes. The particular changes that are implemented by the security assurance service will depend on the implementation and available resources (products, systems, configurations, and the like).

Thus, when the cloud provider deploys the application (or initiates the deployment), it notifies the security assurance service of the one or more selected (or otherwise defined or prescribed) security templates. Preferably, the cloud provider also sends the assurance service details of the application. The security assurance service takes the selected templates as guidance, and the broker component then tailors the detailed security configuration changes required for the existing environment to support the application within the selected security constraints that have been specified and the context of available resources (as determined by the context monitor). If desired, these security configuration changes may be presented to a security administrator for verification before being implemented. Upon verification (if that optional operation is implemented), the security assurance service preferably invokes remote interfaces for software configuration. In addition, and if necessary, the service communicates with the cloud provider to obtain information about any prerequisites (of the cloud provider) that may need to be addressed when deploying the application. These prerequisites may include, for example, creation of a VPN, or other security requirements unique to the provider.

The security assurance service also may provide the ability for a cloud application to specify its security requirements, to ability to have those requirements evaluated, e.g., against a specific cloud deployment environment, and the ability to enable the application to control the security assurance service to provision additional security technology in the cloud to support deployment (or re-deployment elsewhere) of the application if the environment does not have the necessary topology and security resources deployed.

The security assurance service operates generally to deploy security environments (the "secure application zones") for applications running in the cloud environment. After the security assurance service deploys the security zone for the particular application, the application may query the service by passing (e.g., in an application payload) its security rights. If the security capabilities provided by the security assurance service are sufficient or better than the application's security rights, the application functions normally. If, however, the security environment established by the security assurance service is insufficient for the application, the application is afforded one or more remediation options, e.g., administrator notification, shut down (temporary self-deactivation) and administrator notification, issuing a request to the security assurance service to upgrade the security environment, issuing a request to the service to transfer the application to a different cloud security assurance zone, or to a cloud platform with a greater range of security capabilities, issuing a request to the service to transfer to a different cloud zone or cloud platform (e.g., to avoid a hosting conflict, etc.), or the like. The particular remediation options may vary, and the options may be attempted deterministically or in some otherwise configurable manner. In particular, the security assurance service then attempts to implement a remediation option. Upon completion of the option (e.g., upgrade of the security environment, transfer to a new environment, etc.), the application may again query the security assurance service, and the process may be repeated.

Without intending to be limiting, the application security rights may be provisioning using a security rights module and configuration tooling that presents various configuration interfaces and options to an administrator or other permitted user.

Application Self-Service for Assured Log Management in a Cloud Environment

With the above as background, the log management techniques of this disclosure are now described. In a preferred embodiment, log management is carried out in association with a cloud environment (e.g., FIG. 3) in which a security assurance service (e.g., FIG. 6) is implemented, and in association with application deployment technologies and systems (e.g., FIGS. 5 and 6). An implementation in this manner, however, is not a limitation, as the techniques described below may be implemented in other cloud environments that do not incorporate the particular security assurance and deployment services described. The log management service may also be implemented in whole or in part as a standalone solution.

The basic operating assumption is the existence of a cloud environment into which cloud applications are being deployed and managed, and in which such applications have disparate logging requirements. An application may have one or more log resources, namely, components (typically operating in the cloud) that collect and report log data. The particular nature of the log data or the logging resources are not a limitation of this disclosure. Rather, the techniques herein are adapted to facilitate automated log management for any applications deployed on the cloud irrespective of the underlying log resources utilized or the particular logging requirements of the application. The solution also envisions that there may be one or more log management service providers, wherein a log management service provider may be one or more computing entities (possibly operated by a third party) that receive, store, manage and provide log data. A log management service provider thus may operate and manage one or more log servers that are network-accessible and from which collected log data may be viewed, searched or analyzed. Log management systems of this type are known.

Figure 7:
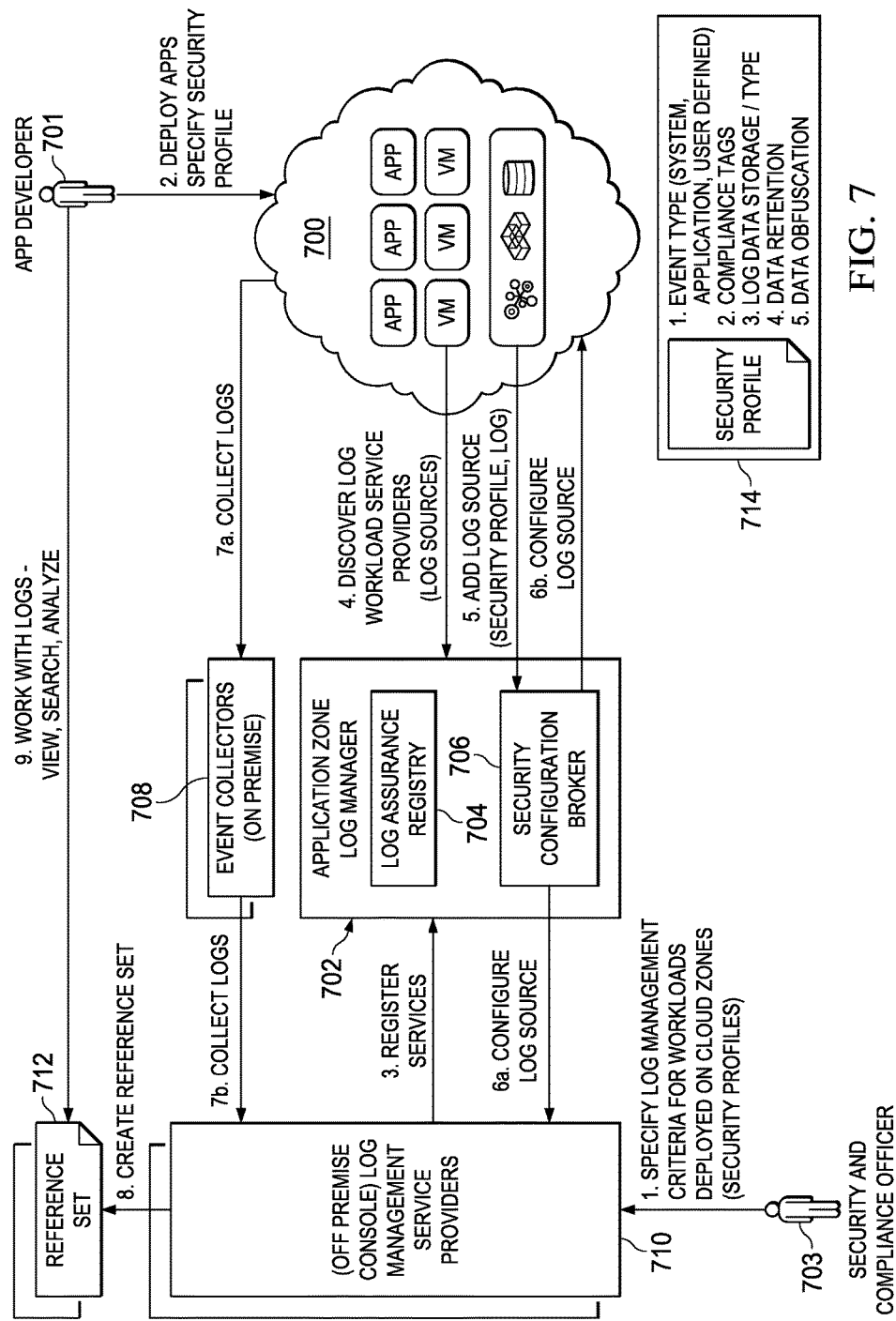
FIG. 7 illustrates a cloud operating environment in which a log management service is provisioned according to this disclosure.

With the above as context, a preferred embodiment of the log management approach of this disclosure is now described. Preferably, the techniques are implemented in an Application Zone Log Manager (AZLM) that, in general, may be implemented as one or more computing machines (e.g., hardware and software). Thus, and as depicted in FIG. 7, a cloud environment 700 comprises or is associated with the Application Zone Log Manager 702 that implements log management according to this disclosure. This nomenclature is not intended to be limiting. As depicted, and for descriptive purposes only, the AZLM 702 comprises two (2) primary components: a log assurance registry 704, and a security configuration broker 706. The basic operation of the AZLM is to facilitate automated log management for any application deployed on the cloud. The AZLM itself typically does not collect, store or output the log data itself; rather, the component operates as a management infrastructure (or layer, or framework) for existing log systems and components that are available on or in association with the cloud itself. For example, event collectors 708, which are typically located on-premises, collect logs, which are provided to the one or more log management service providers 710. As noted above, a log management service provider 710 typically operates one or more logging systems, which may comprise network-accessible log servers, databases, interfaces, and the like.

As also depicted, an application developer 701 interfaces with the cloud 700, primarily to deploy application using the deployment technologies described above (FIGS. 4-5). A security and compliance officer 703 specifies log management criteria for workloads deployed on cloud zones, such as security assurance zones (FIG. 6). Preferably, the log management criteria is specified as one or more security profiles 714. A security profile 714, which is sometimes referred to herein as a "log audit" profile, comprises a set of information, such as, without limitation, event type (system, application, some other user-defined type), compliance tags, log data storage/type, data retention data, and data obfuscation values. The particular structure and format of the security profile may vary; more generally, the particular security (log audit) profile for a particular deployed application may vary from the profile for any other deployed application. As noted, a particular security profile may be defined by a security administrator, by default according to one or more AZLM-supplied templates, or by any other means.

Generally, and as noted above, the Application Zone Log Manager (ASLM) 702 provides automated log management for any applications deployed on the cloud 700. With reference now to FIG. 7, a preferred operation of the system for assured log management is now provided. The particular ordering of the operations is not intended to be limiting.

For descriptive purposes, the process begins at step (1) with the security and compliance officer 703 defining the security (log audit) profile 714 for one or more cloud applications for which the officer has responsibility. While this step is described is described in the context of a human operator having a given responsibility, this is not a limitation, as the security profile, as noted above, may be specified by a machine in an automated or programmatic manner, or based on one or more default security profiles that have been preconfigured or provisioned in the system. As depicted, a security profile 714 specifcs information such as, without limitation, type of the system or application, data retention/obfuscation requirements, log data type and frequency, audit and compliance requirements, and other such information. As also described above, the nature and format of the information that comprises a given security profile 714 typically varies across the cloud applications that are deployed in the environment. Further, a given security profile may change or be updated dynamically, e.g., in response to a condition or other event.

At step (2), an application developer 701 deploys an application, virtual image or virtual system using one or more of the deployment technologies, platforms or systems such as described above in connection with FIGS. 4-5. Preferably, and along with this deployment, the developer 701 selects an applicable security (log audit) profile 714 for the application being deployed. One or more choices of security profiles may be made available to the developer for this purpose. Without limitation, one method to specify the security profile is by attaching one or more unique tags (identifying the application as well as its associated security profile) with the workload during the deployment. In an alternative embodiment, a particular type of application being deployed has a default security profile defined natively (as opposed to being assigned). An application being deployed may have associated therewith more than one security profile 714. While step (2) is described is described in the context of a human operator having a given responsibility, this is not a limitation, as the security profile may be specified by a machine in an automated or programmatic manner, or based on one or more default security profiles that have been preconfigured or provisioned in the system.

At step (3), log assurance registry 704 in the AZLM provides a mechanism by which the application and its security profile can be registered or more generally, "associated" with the AZLM, as well as a mechanism (e.g., using one or more tags) by which other computing entities can look up, e.g., to identify which of the log management service providers 710 is responsible for a given security profile. The registry 704 may be implemented as a service across one or more computing machines on which one or more processes or programs execute. In one embodiment, the log assurance registry 704 is implemented by one or more log management servers.

Step (4) depicts the cloud platform 700 querying these log management servers, e.g., to discover the log management service provider 710 responsible for a particular given security profile. Step (4) may be carried out asynchronously, periodically, or upon a given condition or event.

Step (5) depicts an application or other element in the cloud environment 700 adding a log source to a specific security profile. Step (5) may be carried out asynchronously, periodically, or upon a given condition or event. Thus, and as noted above, the relative positions of steps (4) and (5) in the set of descriptive steps should not be taken as in any way limiting. These operations can occur at any time.

The security configuration broker 706 in the AZLM has several responsibilities. This element may be implemented as a service across one or more computing machines on which one or more processes or programs execute. Preferably, the security configuration broker supports an application programming interface (API) that exposes one or more functions/operations. In general, the broker component 706 forwards log registration requests to the appropriate log management service provider. This is depicted as step (6a), and it may be accomplished by calling an add log source API function. Step (6b) depicts another primary function of the security configuration broker 706, namely, configuring one or more of the log sources or resources in the cloud environment 700 to implement the security profile 714 that has been associated to the application being deployed on the cloud. This required configuration ensures that the log source or the application associated therewith forwards the logs to one or more event collectors 708. Thus, step (7a) represents the actual collection of the log data. At step (7b), the log management service provider 710 the logs from the application (and, in particular, from the event collectors 710 associated therewith) as per the specified security policy 714.

At step (8), the log management service provider 710 creates a reference set 712 for one or more security events. This is a conventional log processing function. At step (9), a reference set 712 is output, e.g., to the application developer 701, via an interface. The information may be provided in any convenient manner (e.g., a physical report, data on a display, as one or more web pages, messages, notifications, alerts, or the like). The data may be viewed, searched, analyzed, or otherwise processed (e.g., for audit or other compliance purposes).

If the application resources or security policy change, then the Application Zone Log Manager 702 is notified. This is depicted at step (10). In response, the security configuration broker 706 may update settings as appropriate to provide log assurance.

Although the log assurance registry 704 and security configuration broker 706 are shown as distinct elements, this is not a requirement. These operations may be combined. Further, and as noted above, these mechanisms may be implemented as a set of computer(s), wherein the set of computer(s) is operatively connected to one or more storage or memory device(s) so that the set of computer(s) can perform the operations respectively associated with program instruction sets that carry out the described operations.

As a skilled person will appreciate, the AZLM operates as a centralized log management system/service. Preferably, one or more log management service providers 710 provide their own log servers for the actual collection and storage of the log data. In operation, the cloud platform 700 provisions new applications and images in a conventional manner. During deployment, the deployment appliance, system or platform (e.g., FIGS. 4-5) can query the centralized log management service (the AZLM). Such a query typically provides an application context, and a deployment topology. The AZLM (typically, the security configuration broker 706) references the supplied application context and deployment topology against defined log requirements (e.g., ISO requirements, administrator-specified settings, or the like) to determine an applicable set of log files, residency and longevity requirements. The AZLM (typically, the security configuration broker 706) then identifies/specifies the log collection requirements that are necessary and instructs the requesting deployment process to configure the one or more log sources and event collectors as needed to satisfy the requirements. As log data is generated by the log sources, logs are sent to a specified log management service provider (and its log servers) for the deployed application, and the log service in the log management service provider handles audit requirements, e.g., based on log context.

The subject matter herein provides significant advantages. It enables dynamic identification of log requirements, e.g., based on application context and deployment topology. When the application or image is deployed, preferably the deployment system handshakes with the log assurance registry to identify applicable logs that will be needed for the deployed cloud application. The security configuration broker configures the required logging elements. Logs are collected and automatically sent to one or more logging servers associated to one or more log management service providers. Preferably, a log management service provider is associated to the identified log requirements. Based on tags or security profiles, the AZLM identifies the cloud resources used by the application and instructs the log management service provider as necessary to facilitate creation of the reference set(s). The approach enables simple and efficient deployment of a new logging server to handle log requirements for any newly-deployed application if there is no matching logging server found. The approach enables efficient reconfiguration of logging connections based on application-side or policy-side changes. The approach further enables reconfiguration of logging servers based on application-side or policy-side changes.

Figure 8:
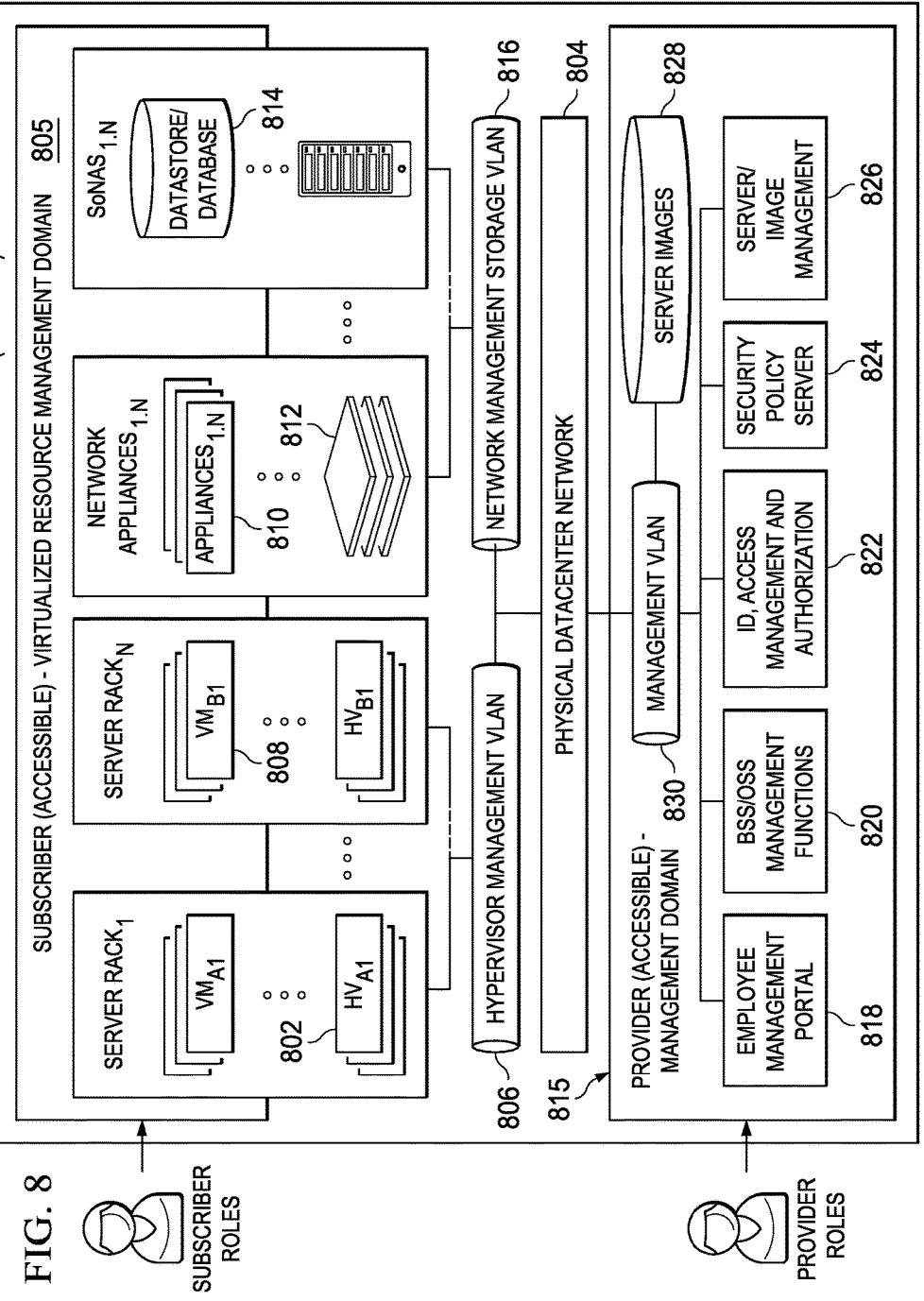
FIG. 8 depicts an exemplary data center in which the application zone log manager of this disclosure may be implemented.

Of course, the above example scenarios and variants should not be taken to limit the disclosed subject matter. For completeness, FIG. 8 illustrates a typical IT infrastructure that supports virtualization of resources and in which the application zone log manager (AZLM) of this disclosure may be implemented. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 8, an example virtual machine hosting environment (alternately referred to herein as a data center or "cloud") is illustrated. This environment comprises host machines (HVs) 802 (e.g., servers or like physical machine computing devices) connected to a physical datacenter network 804, typically via a hypervisor management VLAN 806. Although not depicted explicitly, typically the environment also includes load balancers, network data switches (e.g., top-of-rack switches), firewalls, and the like. As shown in FIG. 8, physical servers 802 are each adapted to dynamically provide one or more virtual machines (VMs) 808 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 810 are hosted in network appliances 812, and tenant data is stored in data stores and databases 814. The applications and data stores are connected to the physical datacenter network 804, typically via a network management/storage VLAN 816. Collectively, the virtual machines, applications and tenant data represent a subscriber-accessible virtualized resource management domain 805. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 815. This domain comprises a provider employee management portal 818, the BSS/OSS management functions 820, various identity and access management functions 822, a security policy server 824, and management functions 826 to manage the server images 828. These functions interface to the physical datacenter network via a management VLAN 830. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

As described, the approach herein may be implemented manually or in an automated manner, in whole or in part.

While a preferred operating environment and use case (a cloud appliance or platform) has been described, the techniques herein may be used in any other operating environment in which it is desired to deploy applications or other services while enforcing a given security context.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute deployment solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, computing entities that manage cloud deployments, as well as improvements to the functioning of the cloud application and other related logging facilities and systems.

As noted, the nature of the log data and what that data is used for (e.g., auditing, compliance, etc.) is not a limitation of this disclosure.

Having described our invention, what we now claim is as follows.

The invention claimed is:

1. A method for automated log management in a cloud environment, comprising:
   associating a security profile with an application being deployed on the cloud, the security profile comprising one or more logging requirements;
   in association with deployment of the application in the cloud environment, receiving a query requesting configuration of a set of log resources in the cloud environment to support the one or more logging requirements for the application being deployed, the query having associated therewith an application context and deployment topology;
   responsive to the query, and based on the security profile, the application context and the deployment topology, determining an applicable set of log files, residency and longevity requirements for the application, and identifying the set of log resources necessary to provide log collection to meet the applicable set as determined; and
   as the application is deployed in the cloud environment, providing configuration information to the cloud environment to enable configuration of the identified set of log resources.

2. The method as described in claim 1 wherein the security profile is selected from a set of security profiles.

3. The method as described in claim 1 wherein the one or more logging requirements includes one of: log data type and frequency, data retention requirements, data obfuscation requirements, and user-defined requirements.

4. The method as described in claim 1 wherein the security profile for a first application being deployed differs from the security profile for a second application being deployed.

5. The method as described in claim 1 further including registering the application and its associated application context.

6. The method as described in claim 5 wherein registering further includes specifying at least one log management service provider from a plurality of log management service providers to collect, store and provide log data in association with use of the application in the cloud environment.

7. The method as described in claim 1 further including providing updated configuration information and reconfiguring logging connections or resources in the cloud environment based on a changes to the application or an applicable policy.

8. Apparatus, comprising:
   a processor;
   computer memory holding computer program instructions executed by the processor to provide automated log management in a cloud environment, the computer program instructions comprising program code operative to:
   associate a security profile with an application being deployed on the cloud, the security profile comprising one or more logging requirements;
   in association with deployment of the application in the cloud environment, receive a query requesting configuration of a set of log resources in the cloud environment to support the one or more logging requirements for the application being deployed, the query having associated therewith an application context and deployment topology;
   responsive to the query, and based on the security profile, the application context and the deployment topology, determine an applicable set of log files, residency and longevity requirements for the application, and identify the set of log resources necessary to provide log collection to meet the applicable set as determined; and
   as the application is deployed in the cloud environment, providing configuration information to the cloud environment to enable configuration of the identified set of log resources.

9. The apparatus as described in claim 8 further including program code operative to select the security profile from a set of security profiles.

10. The apparatus as described in claim 8 wherein the one or more logging requirements includes one of: log data type and frequency, data retention requirements, data obfuscation requirements, and user-defined requirements.

11. The apparatus as described in claim 8 wherein the security profile for a first application being deployed differs from the security profile for a second application being deployed.

12. The apparatus as described in claim 8 further including program code operative to register the application and its associated application context.

13. The apparatus as described in claim 12 wherein a registration specifies at least one log management service provider from a plurality of log management service providers to collect, store and provide log data in association with use of the application in the cloud environment.

14. The apparatus as described in claim 8 wherein the program code is further operative to provide updated configuration information to reconfigure logging connections or resources in the cloud environment based on a changes to the application or an applicable policy.

15. A computer program product in a non-transitory computer readable medium for use in a data processing system, the computer program product holding computer program instructions executed by the data processing system to provide automated log management, the computer program instructions comprising program code operative to:

associate a security profile with an application being deployed on the cloud, the security profile comprising one or more logging requirements;

in association with deployment of the application in the cloud environment, receive a query requesting configuration of a set of log resources in the cloud environment to support the one or more logging requirements for the application being deployed, the query having associated therewith an application context and deployment topology;

responsive to the query, and based on the security profile, the application context and the deployment topology, determine an applicable set of log files, residency and longevity requirements for the application, and identify the set of log resources necessary to provide log collection to meet the applicable set as determined; and as the application is deployed in the cloud environment, providing configuration information to the cloud environment to enable configuration of the identified set of log resources.

16. The computer program product as described in claim 15 further including program code operative to select the security profile from a set of security profiles.

17. The apparatus as described in claim 15 wherein the one or more logging requirements includes one of: log data type and frequency, data retention requirements, data obfuscation requirements, and user-defined requirements.

18. The apparatus as described in claim 15 wherein the security profile for a first application being deployed differs from the security profile for a second application being deployed.

19. The apparatus as described in claim 15 further including program code operative to register the application and its associated application context.

20. The apparatus as described in claim 19 wherein a registration specifies at least one log management service provider from a plurality of log management service providers to collect, store and provide log data in association with use of the application in the cloud environment.

21. The apparatus as described in claim 15 wherein the program code is further operative to provide updated configuration information to reconfigure logging connections or resources in the cloud environment based on a changes to the application or an applicable policy.

\* \* \* \* \*